J. J. HENDERSON.
RESERVOIR AND CHANNEL CLEANER, SILT CONSERVER, AND LEVEE PROTECTOR.
APPLICATION FILED APR. 22, 1912.
1,042,792.
Patented Oct. 29, 1912.
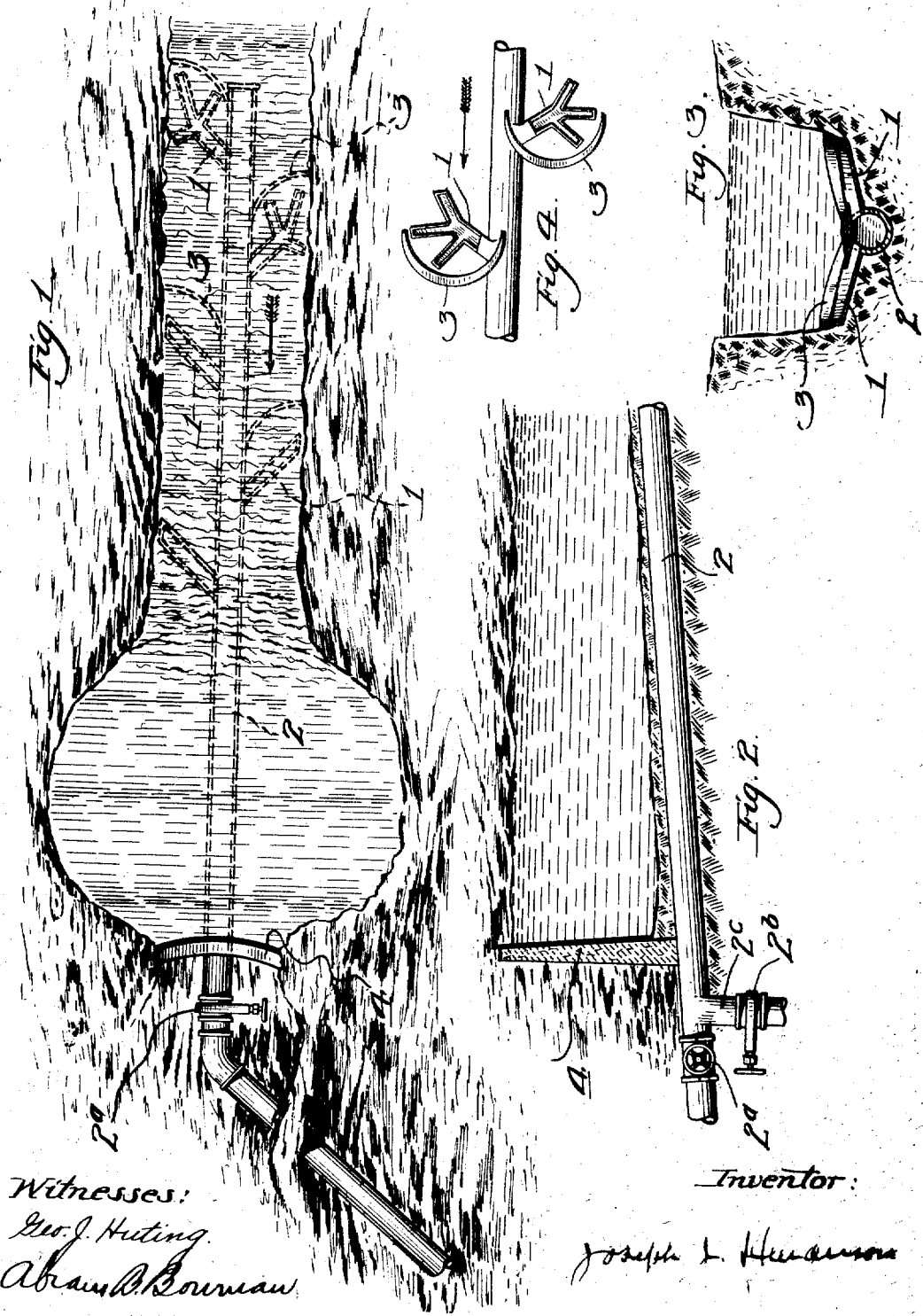

UNITED STATES PATENT OFFICE.

JOSEPH J. HENDERSON, OF SAN DIEGO COUNTY, CALIFORNIA.

RESERVOIR AND CHANNEL CLEANER, SILT-CONSERVER, AND LEVEE-PROTECTOR.

1,042,792.

Specification of Letters Patent.   Patented Oct. 29, 1912.

Application filed April 22, 1912.   Serial No. 692,255.

*To all whom it may concern:*

Be it known that I, JOSEPH J. HENDERSON, a citizen of the United States, and a resident of the county of San Diego, State of California, have invented a certain new and useful Reservoir and Channel Cleaner, Silt-Conserver, and Levee-Protector, of which the following is a specification.

The objects of my invention are, first to prevent the accumulation of sand and silt in storage reservoirs constructed on running streams, and to conduct the silt to riparian lands for fertilizing purposes; second, to prevent accumulations in the channels of navigable or any waters; third, to collect silt from the muddy waters of any running stream, and conduct the same to places to be used for fertilizing purposes, and fourth, to diminish the volume of water in a swollen stream by diverting a part of it with the accumulated silt.

With these and other objects in view, as will appear hereinafter, my invention consists of certain novel features of construction, combination and arrangement of parts as will be hereinafter described in detail and particularly set forth in the appended claims, reference being had to the accompanying drawings, and to the characters of reference thereon, which form a part of this specification, in which:—

Figure 1 is a plan view of a reservoir and channel showing my device in position therein, Fig. 2 is a sectional elevational view of a portion of the same, Fig. 3 is a sectional view of the channel of a stream showing my device for catching the silt, and Fig. 4 is a detail plan view showing my silt catching device in a slightly modified form from that in Fig. 1.

Similar characters of reference refer to similar parts throughout the several views.

Numeral 1 represents sand or silt traps adapted to distribute their contents into the conduit 2, and 3 are wing dams for causing the waters of a stream to eddy over and across the traps, thereby causing the silt to deposit in and around the traps 1. The conduit 2 is laid under the bed of the running stream. It is closed at the upper end and must have a sufficient fall and size to insure effective flushing. Its capacity must exceed that of its combined intake from the traps.

Below the dam 4 or the deposit to be removed, or above the point of diversion, a gate valve $2^a$ is placed to regulate the outflow. Also a gate valve $2^b$ and a sand trap $2^c$ are here installed to liberate the coarse sand if desired.

The sand and silt traps 1 are open boxes, laid flush with the bed of the stream above a reservoir or deposit and are adapted for collecting sand and any loose heavy material and carrying it into the conduit 2.

The heavy material drops into the trap as it moves along the bottom of the stream. These traps extend from the bank to the conduit at an angle and a proper grade for freely carrying their contents into the conduit 2 whenever the gate valve $2^a$ is open.

The wing dams 3 are curved with their lower ends nearly parallel with the stream. They are placed upstream from the silt traps so as to cause the water to eddy, and give it a circulatory movement over and across the trap, for collecting the lighter material that floats in the muddy water of a stream. The silt traps in this case may have several branches converging at or near the point of intersection with the conduit. These act as do so many tide sloughs on an ebb tide; or the horn of the curved or semicircular wing dam next to the conduit may be pointed up stream as shown in Fig. 4. If a branch of the conduit has its intake near the center of the basin, with converging silt traps discharging into it, a vortex is produced, sufficient to give the needed outflow,—see Fig. 4.

For preventing injurious deposits in the channel of a navigable stream or other water course, in addition to the silt traps in the channel of the silt bearing water, the conduit or a branch of the conduit is laid to the place of deposit, with converging silt traps discharging into it.

In tide water where there is a sufficient range of tide, the gate valve should be opened only on the ebb tide.

It thus appears that the objects of my invention as above stated are measurably accomplished by this simple contrivance,—whether it be to prevent the filling up of storage reservoirs, from the greatest one in Egypt or the United States to the smallest one on the tiniest wet weather rivulet in semi-arid America, with the consequent withholding from agricultural lands of nature's best fertilizer, or to remove obstructing deposits in the channels of navigation, or of any water or simply to catch silt from the flood waters of any one of our ten thousand rivers and small streams, for the enrichment of lands all along its course, and at the same time prevent damage from overflow,—depending only on the adequacy and appropriate application of the device for each particular undertaking.

Having thus described my invention, what I claim as new and desire to secure by Letters Patent is:—

1. A conduit laid under the bed of a running stream or tide-water, in combination with submerged sand and silt traps discharged into it, with wing dams in connection therewith, substantially as described in the foregoing specification.

2. In a device of the class described, a submerged conduit combined with a plurality of silt traps and means in connection with said traps for collecting said silt.

3. In a device of the class described, the combination of a submerged pipe, a valve therein, a sand trap in connection therewith, a plurality of sediment traps in connection with said pipe, and means in connection with said traps for collecting said sediment.

4. In a device of the class described, a submerged conduit combined with a plurality of open silt traps connecting with the sides thereof, adapted for collecting the silt.

In testimony whereof, I have hereunto subscribed my name in the presence of two subscribing witnesses.

JOSEPH J. HENDERSON.

Witnesses:
M. A. LUCE,
MARY A. BOWMAN.

---

Correction in Letters Patent No. 1,042,792.

It is hereby certified that in Letters Patent No. 1,042,792, granted October 29, 1912, upon the application of Joseph J. Henderson, of San Diego County, California, for an improvement in "Reservoir and Channel Cleaners, Silt-Conservers, and Levee-Protectors," an error appears in the printed specification requiring correction as follows: Page 2, after line 31, insert the following claim:

5. In a device of the class described, a submerged conduit provided with a plurality of branches adapted to collect and conduct sediment or silt from a stream.

and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.* or of any water or simply to catch silt from the flood waters of any one of our ten thousand rivers and small streams, for the enrichment of lands all along its course, and at the same time prevent damage from overflow,—depending only on the adequacy and appropriate application of the device for each particular undertaking.

Having thus described my invention, what I claim as new and desire to secure by Letters Patent is:—

1. A conduit laid under the bed of a running stream or tide-water, in combination with submerged sand and silt traps discharged into it, with wing dams in connection therewith, substantially as described in the foregoing specification.

2. In a device of the class described, a submerged conduit combined with a plurality of silt traps and means in connection with said traps for collecting said silt.

3. In a device of the class described, the combination of a submerged pipe, a valve therein, a sand trap in connection therewith, a plurality of sediment traps in connection with said pipe, and means in connection with said traps for collecting said sediment.

4. In a device of the class described, a submerged conduit combined with a plurality of open silt traps connecting with the sides thereof, adapted for collecting the silt.

In testimony whereof, I have hereunto subscribed my name in the presence of two subscribing witnesses.

JOSEPH J. HENDERSON.

Witnesses:
M. A. LUCE,
MARY A. BOWMAN.

---

Correction in Letters Patent No. 1,042,792.

It is hereby certified that in Letters Patent No. 1,042,792, granted October 29, 1912, upon the application of Joseph J. Henderson, of San Diego County, California, for an improvement in "Reservoir and Channel Cleaners, Silt-Conservers, and Levee-Protectors," an error appears in the printed specification requiring correction as follows: Page 2, after line 31, insert the following claim:

5. In a device of the class described, a submerged conduit provided with a plurality of branches adapted to collect and conduct sediment or silt from a stream.

and that the said Letters Patent should be read with this correction therein that the same may conform to the record of the case in the Patent Office.

Signed and sealed this 28th day of January, A. D., 1913.

[SEAL.]

C. C. BILLINGS,
*Acting Commissioner of Patents.*

Correction in Letters Patent No. 1,042,792.

It is hereby certified that in Letters Patent No. 1,042,792, granted October 29, 1912, upon the application of Joseph J. Henderson, of San Diego County, California, for an improvement in "Reservoir and Channel Cleaners, Silt-Conservers, and Levee-Protectors," an error appears in the printed specification requiring correction as follows: Page 2, after line 31, insert the following claim:

> 5. In a device of the class described, a submerged conduit provided with a plurality of branches adapted to collect and conduct sediment or silt from a stream.

and that the said Letters Patent should be read with this correction therein that the same may conform to the record of the case in the Patent Office.

Signed and sealed this 28th day of January, A. D., 1913.

[SEAL.]

C. C. BILLINGS,

*Acting Commissioner of Patents.*